United States Patent [19]

Sanders et al.

[11] Patent Number: 5,000,767
[45] Date of Patent: Mar. 19, 1991

[54] DUST COLLECTOR WITH PNEUMATIC SEAL

[75] Inventors: Stephen M. Sanders; Roger D. Williams, both of Charlotte, N.C.

[73] Assignee: Pneumafil Corporation, Charlotte, N.C.

[21] Appl. No.: 530,924

[22] Filed: May 30, 1990

[51] Int. Cl.$^5$ ............................................. B01P 46/04
[52] U.S. Cl. ........................................ 55/302; 55/429; 55/432
[58] Field of Search ................. 55/302, 305, 429, 432, 55/497, 521

[56] References Cited

U.S. PATENT DOCUMENTS

| | | | |
|---|---|---|---|
| 3,577,705 | 5/1971 | Sharlit | 55/302 X |
| 3,849,092 | 11/1974 | Bakke et al. | 55/302 |
| 3,868,238 | 2/1975 | Mills et al. | 55/302 X |
| 4,581,050 | 4/1986 | Krantz | 55/429 X |
| 4,680,039 | 7/1987 | Revell | 55/429 X |

Primary Examiner—Charles Hart
Attorney, Agent, or Firm—Shefte, Pinckney, Sawyer

[57] ABSTRACT

A dust collector for removing entrained particles from an air stream that includes filter elements that are periodically cleaned, such as by a pulse jet, to remove the collected particles therefrom, which particles move downwardly to a hopper at the bottom of the dust collector. A container having a removable lid and a drum portion are disposed beneath the hopper to receive the collected dust particles for ultimate removal, and the lid is securely sealed to the drum portion of the container by an annular inflatable balloon-type seal that extends between a flange on the lid and the side wall of the drum, with the air used to operate the inflatable seal preferably being obtained from the existing pulse jet system for the dust collector.

7 Claims, 3 Drawing Sheets

DUST COLLECTOR WITH PNEUMATIC SEAL

BACKGROUND OF THE INVENTION

The present invention relates generally to improvements in dust collectors and the like, and more particularly to an improved construction by which the container for receiving and containing the collected dust particles can be provided with an air-tight seal for improving the operation of the dust collector.

Briefly summarized, industrial dust collectors are provided with a housing in which a plurality of filter elements are disposed, usually cylindrical pleated paper filter elements. Air having particles of matter entrained therein is caused to flow through the filter elements, usually whereby the entrained particles in the air are deposited on the exposed surfaces of the filter elements. It is also common practice to provide such dust collectors with an arrangement for cleaning the filter elements at periodic intervals by causing a flow of air to pass through the filters in a reverse direction as compared with the normal air flow through the filter so that the particles collected thereon are blown off or otherwise separated from the filter and permitted to fall downwardly in the housing where the particles are received and stored in the dust collector until they can be removed at suitable intervals.

The most common way in which the collected dust particles are removed is to provide a drum or similar container that can be placed directly beneath the hopper, and provide the hopper with a selectively operable valve (e.g. a slide valve) that normally closes the hopper and blocks the flow of particles from the hopper to the drum, and that can be opened when needed to permit the particles collected in the hopper to flow into the drum, after which the valve is closed and the drum can be taken away to another location at which the particles can be properly disposed of, and a fresh, empty drum is placed under the hopper to receive the next load of collected particles.

During normal operation of this hopper, a vacuum is imposed across the filter elements to cause the above described flow of air therethrough, and it is important that there be no significant flow of air within the hopper portion of the dust collector because any such air flow tends to disturb the particles collected in the hopper to an extent that they may become reentrained in the air flow through the filter elements, all of which reduces the efficiency of the dust collector and the active life of the filter elements.

Because of this desired zero flow condition, it is important for the collecting drum, even though it was to be removable from the hopper as described above, to have a substantially air-tight seal with the drum so that air is not drawn into the hopper at its connection with the drum during normal operation of the dust collector, and there are several known methods of providing such a seal.

First, it is known to utilize a conventional rotary air-lock valve that includes a rotating valving member in a cylindrical valve housing. At one position of the valve member, the openings therein are aligned with the openings in the valve housing so that the dust particles can fall through the valve and into the drum. When the valve member is rotated a predetermined amount (e.g. 90 degrees), the aforesaid openings are no longer aligned, and the hopper is sealed. While such valves are generally satisfactory, they are relatively expensive, and the required seal elements between the valve member and the valve housing tend to wear out generally because of the construction of moving mechanical parts and the constant exposure of the seal elements to the abrasiveness of the collected particles. Similarly, a so-called double dump valve is also used to seal the hopper by providing a pair of pivoted valve plates that are arranged to permit flow from the hopper when both valve plates are opened simultaneously. Because these dump valves also have moving parts and exposed seal elements, they have the same disadvantages as the rotary valves and they are more inclined to leak.

Finally, a slide gate and drum arrangements is perhaps the most popular sealing valve used in dust collectors, probably because it is relatively inexpensive in comparison with the rotary air-lock valve and double dump valve. The slide valve is normally open during the time the dust collector is operating, and it is closed only when the drum becomes filled with dust and must be replaced with an empty drum. Because the slide valve is open during normal operation, it becomes particularly important that the removable lid for the drum must have a good, substantially air-tight seal with the container portion of the drum to prevent the flow of air into the hopper caused by the vacuum in the dust collector during operation. At the present time, the lid of the drum is sealed to the container portion of the drum only by providing a sealing material (e.g. neoprene) between the circular lip of the container portion and the flat bottom surface of the lid. Under new or ideal conditions, this seal is usually sufficient, but as a practical matter the drums and their lids are subject to rough treatment during the handling thereof, and such rough treatment ultimately results in the lids becoming bent, or the circular lip of the container portion becoming out of round or dented, or some other condition that will adversely affect the seal between the lip and the lid, all of which can affect the efficiency of the dust collector and the life expectancy of the filter elements as described above.

In accordance with the present invention, the aforesaid drawback of conventional sealing arrangements are overcome or significantly alleviated.

SUMMARY OF THE INVENTION

In the preferred embodiment of the present invention, a dust collector is provided which includes a plurality of filter means for separating entrained particles from an air stream, fluid flow means for causing the air stream to pass through the filter means and to deposit entrained particles on the surface of the filter means, and filter cleaning means for cleaning the particles from the filter means at predetermined intervals by utilizing a source of pressurized cleaning air that is passed through the filter means, preferably in a direction opposite to the normal flow of the air stream through the filter elements. Means is provided for collecting the particles for removal from the dust collector, including a hopper that directs the particles in a downward direction, and a container is provided for receiving the particles from the hopper. The container means includes a primary container portion and a selectively removable lid portion normally closing the primary container portion, and an inflatable seal means is disposed between the primary container portion and the removable lid portion for selectively providing a seal therebetween. In the preferred embodiment of the present invention, air for operating the inflatable seal means is provided by an inflating means which includes a conduit connecting the aforesaid source of pressurized air from the filter cleaning arrangement to the inflatable seal means, and an air valve is provided for controlling the flow of such pressurized air to the inflatable seal means.

In the preferred embodiment of the present invention, the container means is preferably a cylindrical drum having a vertically extending circular wall, and a removable lid having a flat surface for engaging the upper lip of the cylindrical drum wall to provide a first seal thereat, and the lid includes a downwardly projecting flange that is spaced from the outer surface of the drum wall with the inflatable means being disposed between the flange and the drum wall so that when the inflatable seal is inflated, it will provide a secure seal between the lip flange and the side wall of the drum, rather than relying solely on the seal at the cylindrical lip of the drum which has the inherent drawbacks described above.

DESCRIPTION OF THE PREFERRED EMBODIMENT

Figure 1:
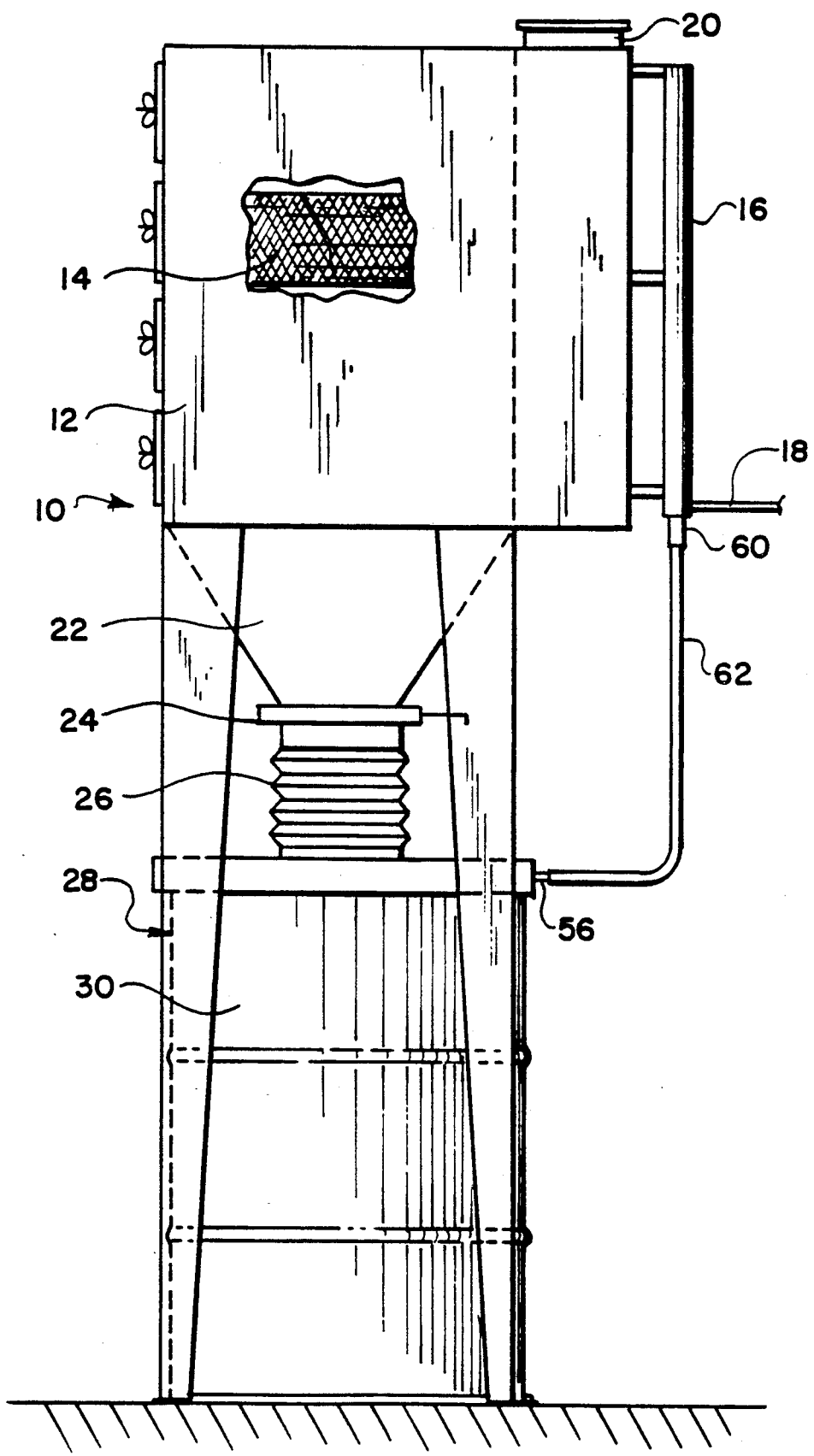
FIG. 1 is a side elevational view of a dust collector embodying the present invention.

Looking now in greater detail at the accompanying drawings, FIG. 1 illustrates a dust collector 10, the upper portion of which is conventional and includes a housing 12 in which a plurality of horizontally disposed filter elements 14 are supported within such housing 12, only one such filter 14 being actually illustrated in FIG. 1. A conventional pulse-jet filter cleaning apparatus is diagrammatically illustrated by reference numeral 16 in FIG. 1, and a source of high pressure air for the pulse-jet filter cleaning arrangement is introduced into the pulse-jet arrangement 16 by an inlet conduit 18.

The details of the operation of the upper portion of the dust collector 10 are generally conventional and well known, and a more detailed explanation of the operation of the dust collector may be obtained by reference to co-pending U.S. patent application Ser. No. 351,095, filed May 12, 1989. For present purposes, it is sufficient to understand that air having foreign matter such as dust particles entrained therein flows into the housing 12 through an inlet opening 20, such flow usually being caused by a vacuum maintained within the housing 12 by a vacuum source connected to the housing through an outlet (not shown). This dirty air is caused to flow through the filter elements, which are preferably cylindrical pleated paper filters, in a radial direction from the outside of the filter to the inside of the filter, and the inside of the filter elements 14 are all connected to a outlet plenum from which the clean air is removed from the housing 12 through the aforesaid outlet. Dust or other foreign matter entrained in the inlet air will be deposited on the exterior surfaces of the filter elements 14 as the air flows radially inward thereof, and this dust or foreign matter will collect and build up at such exterior surface. In accordance with conventional practice, at periodic intervals (which may be timed or based on pressure drop across the filter elements) a pulse of high pressure air is emitted from the pulse jet arrangement 16 by opening a valve (not shown), and this pulse jet is caused to flow into and through the filter elements 14 in a direction opposite to the normal flow of air therethrough so that the foreign matter or dust particles which have collected on the exterior surface of the filter elements 14 will be momentarily separated from the filter element and moved outwardly therefrom so that the dust particles will fall downwardly towards the hopper 22 at the bottom of the housing 12. Since the filter elements 14 are usually arranged in vertical tiers, some of the dust particles which are removed from a higher filter element by the pulse jet may become entrained in a lower filter element, but, eventually, most if not all of the dust particles will ultimately make their way downwardly to the hopper under the influence of the pulse jets and gravity.

Figure 2:
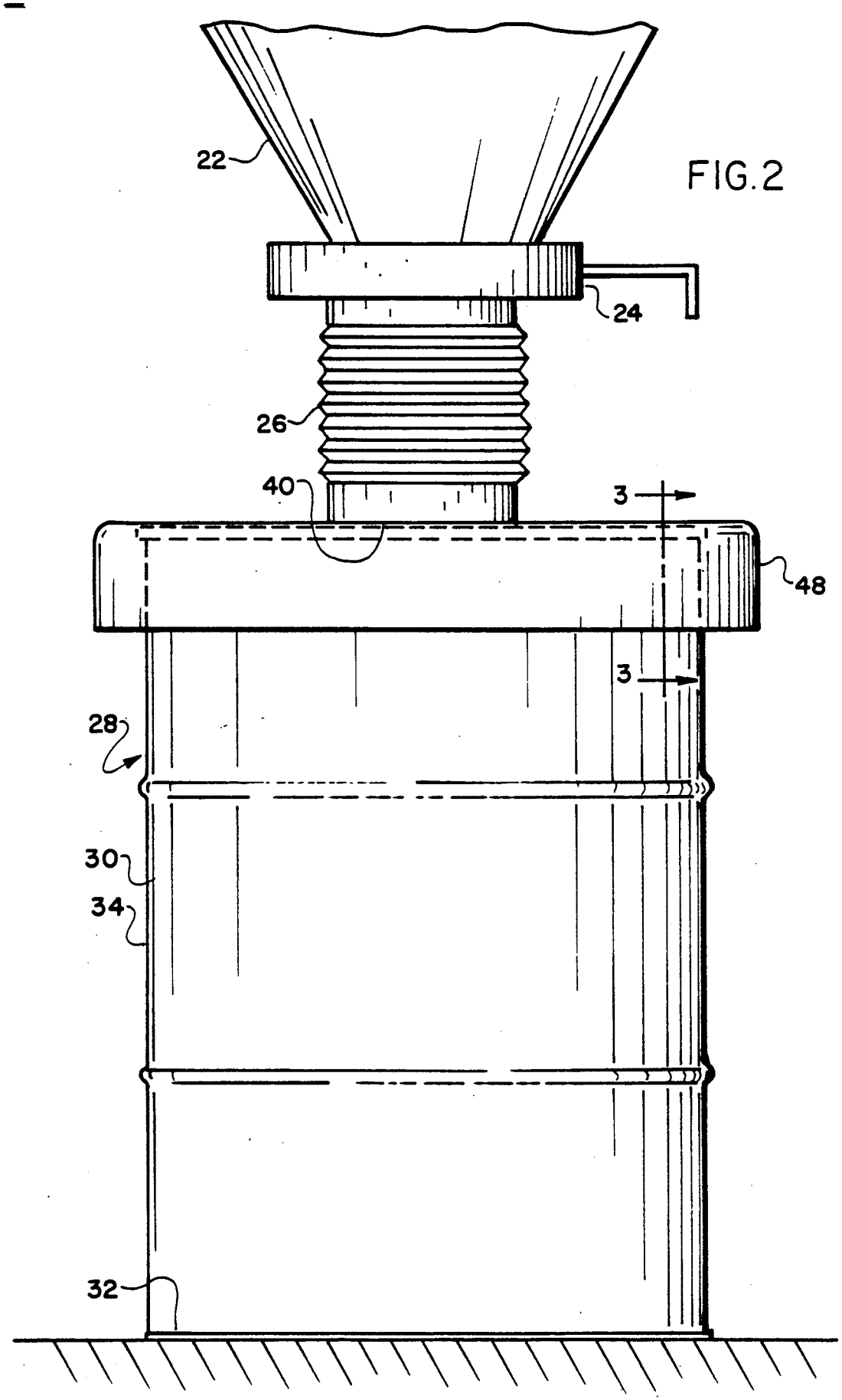
FIG. 2 is a detailed view showing the lower portion of the hopper and the collecting drum of the present invention.
Figure 3:
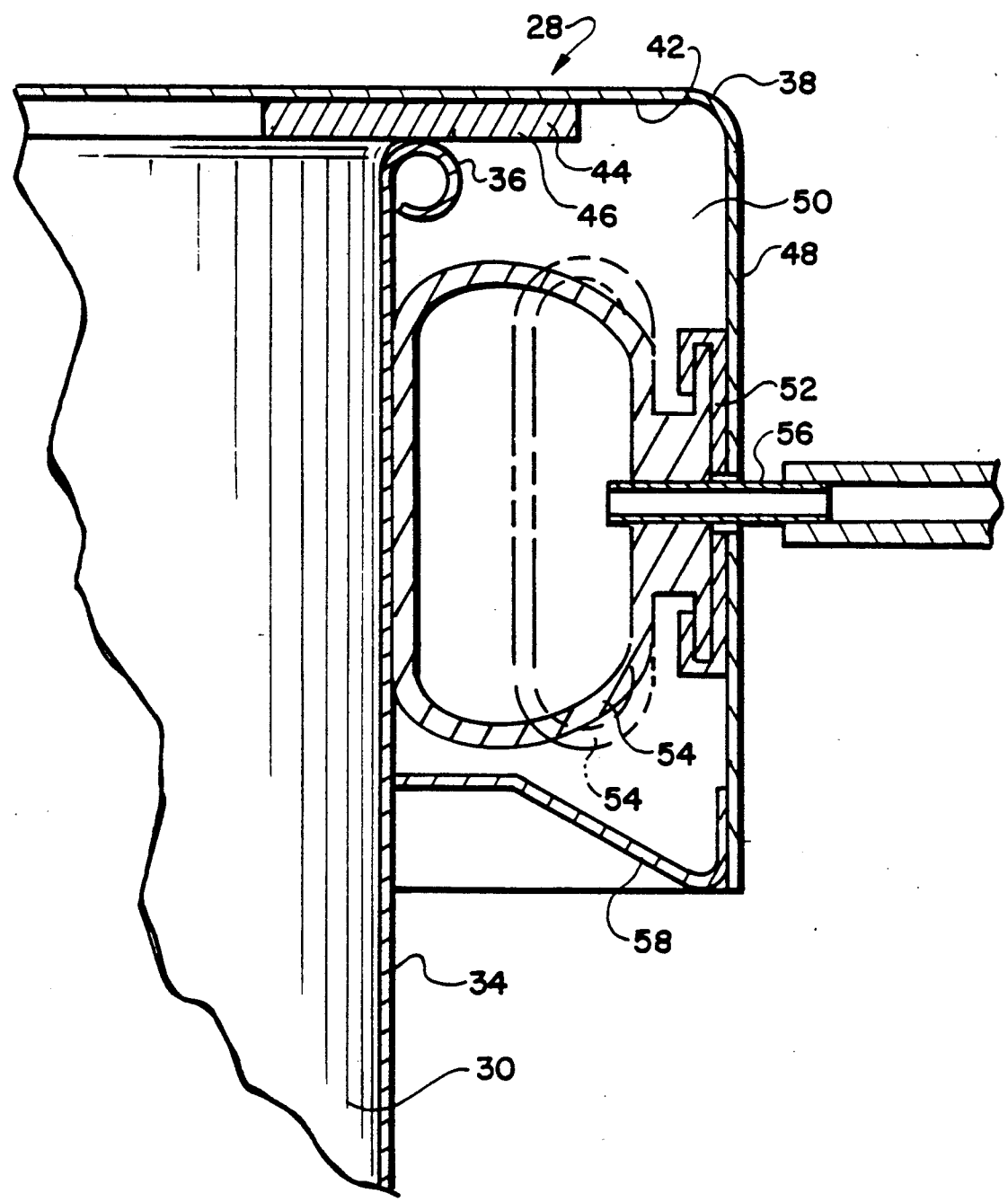
FIG. 3 is a detailed view taken substantially along line 3—3 in FIG. 2, and illustrating the inflatable seal of the present invention.

As discussed above, the foreign matter removed from the air by the dust collector 10 must be collected and periodically removed from the dust collector 10. Accordingly, a conventional slide valve 24 is mounted at the bottom face of the hopper 22 for opening and closing the bottom outlet opening of the hopper 22, all in a known manner. A length of flexible conduit 26 is provided between the bottom of the slide valve 24 and the upper surface of a container that is generally indicated by the reference numeral 28. As best seen in FIGS. 2 and 3, the container 28 includes a lower drum portion 30, which includes a bottom wall 32, and a vertically extending cylindrical wall 34 that presents at its uppermost surface a lip 36 formed by the upper edge of the side wall 34 being formed on a radius as best illustrated in FIG. 3. The container 28 also includes a lid 38 having an opening 40 therein to receive the lower end of the flexible conduit 26 through which collected particles fall into the drum 30. The lid 38 is cylindrical in shape, and it is provided with a flat interior surface 42 on which is positioned an annular seal 44 which also presents a flat surface 46 that engages the lip 36 of the drum 30 to provide a seal thereat.

As best illustrated in FIG. 3, the lid 38 includes a depending circular flange 48 that extends downwardly in spaced parallel relation to the vertical side wall 34 of the drum 30, whereby an annular spacing 50 is formed between the side wall 34 and the flange 38. A mounting bracket 52 is mounted on the inside wall of the flange 48, and an annular balloon-type seal 54 is mounted in the bracket 52 so that it extends around the entire inside periphery of the flange 48. The seal 54 is made from any suitable resilient material, such as neoprene, and the enclosed interior area thereof is supplied with air or other fluid through an inlet conduit 56 that extends through the flange 48, the mounting bracket 52, and the base portion of the seal 54. In its normal or deflated condition, which is shown in broken lines in FIG. 3, the seal 54 occupies a sufficiently small portion of the annular spacing 50 to permit the entire lid 38 to be placed onto, or lifted off of, the drum 30 without interfering with such movement. On the other hand, when pressurized air is introduced into the seal 54 through the inlet conduit 56, it assumes an inflated position as shown in full lines in FIG. 3 in which it extends fully across the annular spacing 50 and engages over a large area of contact the drum side wall 34, thereby forming a full and complete annular barrier extending entirely around the drum 30 and all the way across the spacing 50 to prevent any air from flowing into or out of the drum 30 or the hopper 22 that communicates with the drum 30. It will also be noted that the lid 38 is provided with an annular projection plate 58 mounted at the inside surface of the flange 48 and having a generally upward extent to a point just beyond the innermost dimension of the seal 54 in its deflated condition. By virtue of this arrangement, the projection 58 provides protection for the seal 54 when the lid 38 is removed from the drum 30 and, particularly, when the lid 38 is being placed onto the drum 30, in which case the projection 58 actually serves to engage the lip at the open end of the drum 30 so as to guide the lid 38 into place on the drum 30 with the flange 48 generally evenly spaced from the drum side wall 34. Also, as noted above, it will be seen that when the lid 38 is lowered onto the top of the drum 30, the projection 58 protects the seal 54 from being engaged by the lip of the drum 30.

It will be apparent that the pressurized fluid for causing movement of the seal 54 between its inflated and deflated positions may come from any suitable source, but it has been found particularly advantageous in the present invention to obtain pressurized air for this purpose directly from the pulse jet 16 filter cleaning system described above. Accordingly, in the preferred embodiment of the present invention, a combination of a pressure reducer and an on-off valve are attached to the pulse jet system 16 as diagrammatically indicated by reference numeral 60 in FIG. 1 and a connecting conduit 62 extends from the valve arrangement 60 to the seal inlet conduit 56. In normal operation, the stored air pressure maintained in the pulse jet system 16 is generally in the range of 90-110 psi, whereas the desired pressure range for the air in the seal 54 is 5-25 psi, preferably about 10 psi. Accordingly, the valve arrangement 60 is selected so that it will reduce the pressure of the air in the pulse jet system to a suitable pressure for properly operating the seal 54.

It will be apparent that the pressure seal arrangement of the present invention offers a number of advantages. For example, and as discussed in greater detail above, when the dust collector 10 is operated at a vacuum or negative pressure within the housing 12, the fully positive seal provided by the seal 54 will prevent air from flowing inwardly into the drum and up through the hopper 22, thereby creating a disturbance of the air in the hopper 22 which can cause undesirable reentrainment of the dust particles. Also, if the dust collector 10 is of the type that operates under an elevated pressure in the housing 12, the positive sealing effect of the seal 54 will insure that this positive pressure does not blow collected dust in the hopper 22 or the drum 30 outwardly between the drum 30 and the lid 38. Finally, it will be noted that the seal 54 extends as an annular balloon around the entire periphery of the drum side wall 34, and, therefore, when the seal 54 is operated to its expanded or inflated position, it will inherently act to properly position the lid 38 on the drum 30 so that the flange 48 is substantially equidistant from the side wall 34 around the entire periphery of the drum 30.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A dust collector for removing entrained particles from an air stream, such dust collector including:
    (a) a plurality of filter means for separating such particles from said air stream;
    (b) fluid flow means for causing said air stream to pass through said filter means and to deposit entrained particles on the surface of said filter means;
    (c) filter cleaning means for cleaning said particles from said filter means at predetermined intervals by utilizing a source of pressurized cleaning air passing through said filter means;
    (d) means for collecting said particles for removal from said dust collector including a hopper for directing said particles downwardly, and container means for receiving said particles from said hopper, said container means including a primary container portion, a selectively removable lid portion normally closing said primary container portion, and an inflatable seal means disposed between said primary container portion and said removable lid portion for selectively providing a seal therebetween; and
    (e) inflating means for said inflatable seal, including conduit means for connecting said source of pressurized air to said inflatable seal means, and air valve means for controlling the flow of said pressurized air to said inflatable seal means.

2. A dust collector as defined in claim 1 and further characterized in that said inflating means is mounted on said removable lid.

3. A dust collector as defined in claim 1 and further characterized in that said primary container portion is a drum having a vertically extending side wall, in that said removable lid is supported at the lip edge of said side wall and includes a flange extending in spaced relation to said side walls, and in that said inflatable means is disposed between said side wall of said drum and said flange to provide a seal thereat when said inflatable seal is inflated.

4. A dust collector as defined in claim 3 and further characterized in that said removable lid is formed with a projecting surface portion disposed to protect said inflatable seal from damage during removal and replacement of said removable lid on said drum.

5. A dust collector as defined in claim 3 and further characterized in that said drum is cylindrical in shape, in that said lid is circular in shape with said flange having a circular shape and defining an annular space between said flange and the side wall of the cylindrical drum, and in that said inflatable seal is disposed within said annular space.

6. Dust receiving and collecting apparatus for use with dust collectors and the like that include filter means for removing entrained particles from an air stream caused to pass through said filter means, and that includes filter cleaning means for periodically removing such particles from filters and collecting them in a hopper, said dust receiving and collecting apparatus comprising:
- (a) container means adapted to be located beneath said hopper for receiving said particles collected therein;
- (b) a selectively removable lid supported at said container for normally closing said container, said removable lid including a portion that extends in spaced relation to said container means;
- (c) inflatable seal means disposed in said space between said container and said removable lid, said inflatable seal being operable between a first inflated position at which it extends across said space and in contact with both said container means and said removable lid to provide a positive seal therebetween, and a second deflated position at which it is spaced from said container means or said lid by a sufficient amount to permit said removable lid to be removed from said container means; and
- (d) inflating means for varying the pressure of a fluid within said inflatable seal means to operate it between said first and second positions thereof.

7. Dust receiving and collecting apparatus as defined in claim 1 and further characterized in that said container means is a cylindrical drum having vertically extending side walls, in that said removable lid is generally circular and provided with a depending circular flange extending in spaced parallel relation to said side wall of said container to form an annular spacing therebetween, and in that said inflatable seal is an annular balloon mounted on said removable lid and disposed in said annular spacing.

* * * * *